Sept. 6, 1927.   J. G. UTZ   1,641,242
MOTOR VEHICLE CONSTRUCTION
Filed March 5, 1926   2 Sheets-Sheet 1

Inventor
John G. Utz

Sept. 6, 1927. 1,641,242
J. G. UTZ
MOTOR VEHICLE CONSTRUCTION
Filed March 5, 1926 2 Sheets-Sheet 2
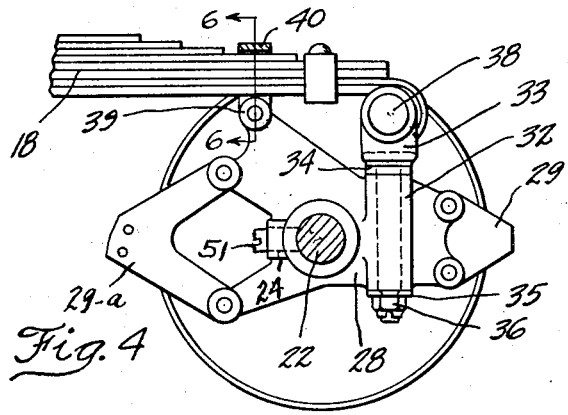
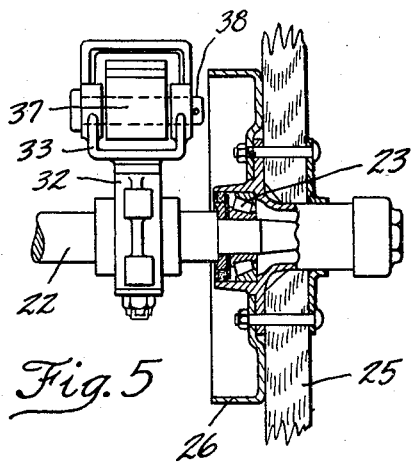
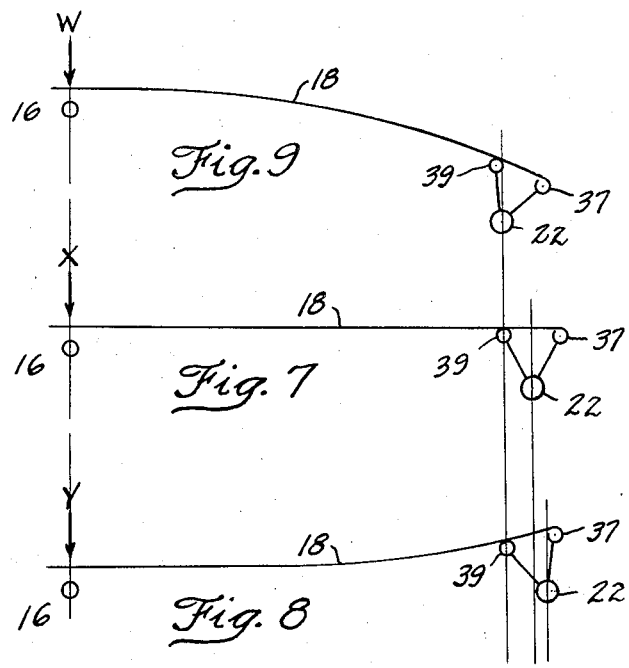
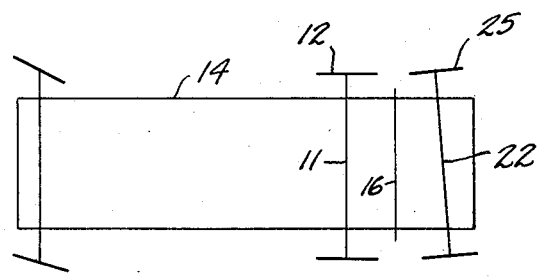
Inventor
John G. Utz.

Patented Sept. 6, 1927.

1,641,242

UNITED STATES PATENT OFFICE.

JOHN G. UTZ, OF DETROIT, MICHIGAN.

MOTOR-VEHICLE CONSTRUCTION.

Application filed March 5, 1926. Serial No. 92,415.

The invention relates to motor-vehicle construction, and more particularly to a method of attaching an axle to a motor vehicle chassis frame by means of leaf springs alone, so that the axle is located with respect to the frame without the use of the customary radius rods, torque tubes and the like. The construction includes automatic means for moving the axle, thus attached, out of parallel with an adjacent axle to assist the vehicle in turning corners, thus reducing tire wear.

My invention is also useful in attaching an additional load carrying axle to a Ford or similar truck chassis by means of leaf springs of the inverted semi-elliptic type, thus endowing the vehicle with more load carrying capacity and at the same time providing an additional set of wheel brakes, the torque reaction of which is transmitted thru the leaf springs to the vehicle frame, thereby softening the brake action by the cushioning effect of the spring.

My co-pending application Serial Number 71,573 filed November 27th, 1925, illustrates a construction wherein the additional axle is located by a combination of springs and radius rods, which together react the brake torque. To make such a construction function with satisfaction, it is necessary to provide ball and socket joints at each end of each radius rod, which ball joints in turn must be provided with lubricating facilities, thus making the construction both intricate and costly.

The invention described herein greatly simplifies the former construction, with consequent economy, yet it functions with entire satisfaction. In addition, my invention, when used to apply an additional axle to a two axle vehicle to transform it into a three axle vehicle, or employed in the original construction of a vehicle of more than two axles, functions to assist the vehicle in turning corners by moving the two rear axles out of parallel and in the proper direction to reduce the rub or slip of the tires on the ground that occurs when two non-steering axles are restrained in substantially parallel relation at all times.

While my invention primarily proposes the attachment of non steering axle to a vehicle frame, the same construction is applicable to front or steering axles, whereby two front or steering axles can be attached to the ends of inverted leaf springs, which in turn are attached to the vehicle frame, thus locating the axles correctly and reacting brake torque should the steering wheels be equipped with brakes.

In my invention, no use is made of the natural shortening and lengthening of the spring itself caused by its deflection. By a geometric arrangement of connections I provide for considerable movement of the axles out of parallel relation when the centrifugal force occasioned by turning corners imposes additional load on the outside spring and decreased load on the inside spring.

With the above and other objects in view, my invention consists of the arrangement, combination and construction of the various elements of my improved device as described in the specification, claimed in my claims, and shown in the accompanying drawings.

Fig. 4 is a detail showing a side elevation of the attachment of a dead load-carrying axle to the end of a leaf spring.

Fig. 5 is an end view of the construction shown in Fig. 4.

Fig. 6 is a section taken on line 6—6 on Fig. 4.

Fig. 7 is a diagram of the shape of the rear portion of one of the leaf springs when under normal load.

Fig. 8 is a diagram of the shape of the rear portion of one of the leaf springs when under more than normal load.

Fig. 9 is a diagram of the shape of the rear portion of one of the leaf springs when under less than normal load.

Fig. 10 is a diagram of a chassis in plan view showing relative wheel and axle positions when turning a corner to the right.

Figure 1:
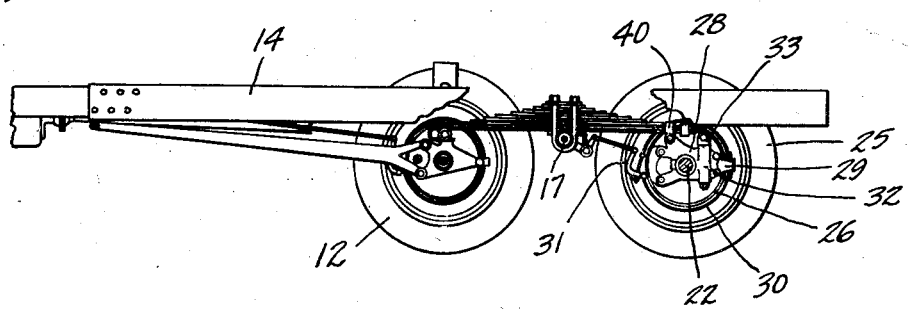
Fig. 1 is a side elevation of the rear portion of a vehicle chassis with the frame cut away to disclose the rear spring connections to the axles.

In the drawings, 11 designates the rear driving axle of a motor vehicle with its wheels 12. 14 is a chassis frame to which are attached the trunnion brackets 15 which carry the trunnion shaft 16. On the outer ends of the trunnion shaft 16 are swivelled the spring seats 17, to which are rigidly bolted the springs 18 by means of the clips 19, plates 20 and nuts 21. 22 is a dead load-carrying axle with bearings 23 on its outer ends, upon which run the wheels 25, to which in turn are attached the brake drums 26.

Bracket 28 is attached rigidly to the axle 22 on one side of the vehicle and free to rotate on the other side. For instance, an opening 24 is provided in each of the brackets 28. In order to anchor one bracket, a set screw 51 bearing against the axle 22 may be inserted in the opening 24. The other opening in the other bracket would then be unused which would permit it to rotate about the axle 22. Arms 29 and 29ª are rigidly attached to the bracket 28 and serve to anchor the brake band 30 to the bracket 28 when the brake is actuated by operating the lever 31, thus tending to rotate the bracket 28 about the center of the axle 22. On the bracket 28 is the integral portion 32 in which swivels the yoke 33. Yoke 33 is located vertically from above by the shoulder 34 and from below by the washer 35 and the nut 36. The adjustment is such that while the yoke 33 is free to rotate about its axis, there is no vertical play.

A conventional spring eye 37 on the end of the leaf spring 18 is attached to the opening in the yoke 33 by the horizontal pin 38. The spring eye is a snug fit laterally in the yoke opening, and the pin 38 is free to rotate in the eye 37. The pin 38 is back of and above the center of the axle 22. Since the load on the spring is downward on the pin 38, and since the pin 38 is back of the axle center, the bracket 28 tends to rotate about the axle center, bringing the boss 39, which is integral with the bracket 28, up against the under side of the spring 18. The boss 39 is above and forward of the axle 22 by an amount preferably equal to the distance that the pin 38 is above and back of the axle 22, thus bringing about a condition of equilibrium.

A safety strap 40 is attached to the boss 39 by the bolt 41 and nut 42. The width of the boss 39 is greater than the width of the spring 18 so that there is sufficient clearance between the sides of the spring 18 and the strap 40 to permit the spring to move laterally when the yoke 33 swivels in a manner to be described later. The safety strap 40 just clears the top of the spring 18 so that contact between the spring and the strap does not occur unless the boss 39 moves downward away from its normal contact with the under side of the spring 18.

It will be understood that the assembly of both springs is the same and that the above description should be taken as applied to the springs on both sides of the vehicle. It will be observed that any force, such as brake torque reaction, tending to rotate the bracket 28 about the axle 22, will be transferred to the spring 18 and thence to the chassis frame 14. When such a force is clockwise (from the views shown in Fig. 1 and Fig. 4) the spring will be bent upwards as tho its load were reduced, and when the force is counterclockwise, the spring will be bent downwards as tho its load were increased. Thus it will be seen that such forces are cushioned by the spring.

Figure 2:
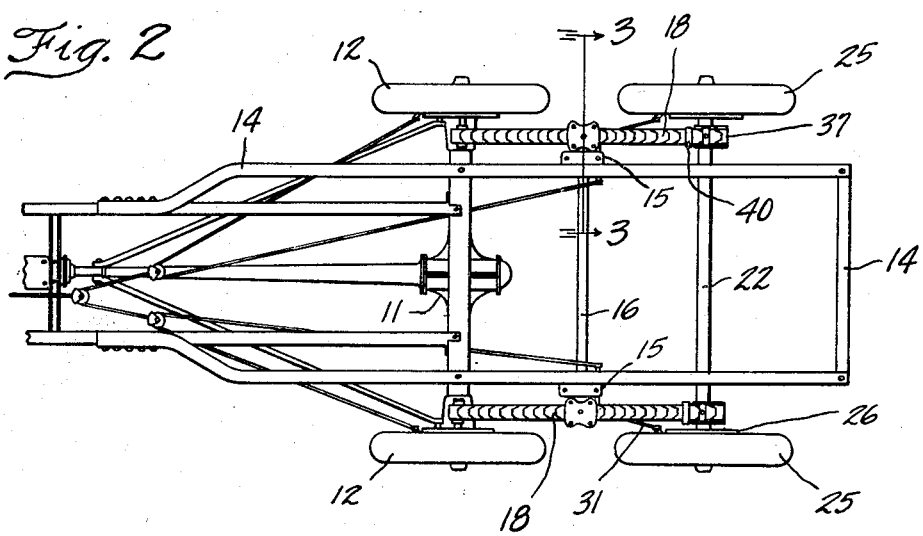
Fig. 2 is a plan view of a portion of the chassis shown in Fig. 1.
Figure 3:
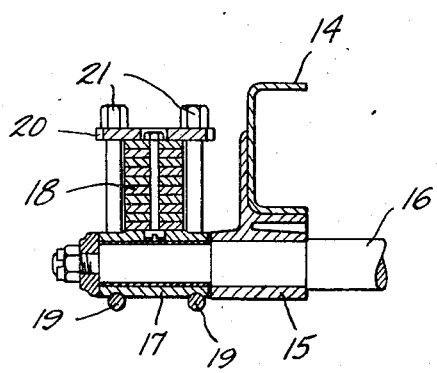
Fig. 3 is a section taken on line 3—3 of Fig. 2.

When the vehicle is evenly loaded and proceeding straight forward, the axles 11 and 22 are substantially parallel to each other and to the trunnion shaft 16 when viewed in plan as in Fig. 2. Assuming that the load of the vehicle is such that the springs 18 are straight in form as shown in Fig. 7, the distance from the trunnion shaft 16 to the axle 22 will be the same on both sides of the vehicle. Now if a corner is turned to the right, the centrifugal force of the mass above the springs will cause a greater load to be imposed upon the outside or left hand spring, whereupon it will take a form like that shown in Fig. 8. At the same moment a lesser load will be imposed on the right hand or inner spring, whereupon it will take a form like that shown in Fig. 9.

From the diagrams thus described, it will be noted that when a greater load is imposed on a spring the distance from the trunnion shaft 16 to the axle 22 will be increased on its side of the vehicle, and when a lesser load is imposed, the distance from the trunnion shaft 16 to the axle 22 will be decreased on that side, and axle 22 will assume the position indicated in Fig. 10. This peculiar action occurs because the spring attachment is above the axle by an amount sufficient to cause substantial axle movement and more than offsets any shortening effect of the spring itself due to its deflection.

When a turn in the opposite direction is made, the axle 22 is moved out of parallel relation with the trunnion shaft 16 in the other direction, thus producing an appreciable amount of automatic regulation of the position of the axle 22 with relation to the shaft 16 and the driving axle 11. The attachment of the driving axle 11 to the spring 18 is such that the axle 11 is not thrown out of parallel relation with the trunnion shaft 16 when viewed in plan as in Fig. 2. In this particular construction, the brake and driving torque reactions of the axle 11 are accommodated by other means than the spring 18, as by radius rods.

Since the springs 18 are held in parallel relation by their rigid attachment to the spring seat 17 on the trunnion shaft 16, and the axle 22 moves out of parallel relation to the trunnion shaft 16 when the above described action takes place, the swivel yokes 33 will pivot on their vertical axis an amount sufficient to permit these springs to move out of their original and normal angular relation to the axle 22 when viewed in plan, and the spacing between the strap 40 and the sides of the spring 18 will accommodate the lateral relative movement without restraint in that direction. The provision of this swivel action permits free movement of the parts without undue strain, and yet the axle location is positively controlled in a satisfactory and safe manner.

It should be noted that if wheel brakes are omitted from the wheels 25, or if other means are provided for reacting brake torque, the automatic self steering effect above described will not be disturbed.

I do not wish to limit myself to the attachment of a dead axle only, because the same spring attachment method could be employed in conjunction with a live or housed axle, in which case the bracket 28 would surround the axle housing, and if desired the brake anchorage could be made fast to such a housing thereby relieving the springs of the brake reacting function.

It will be apparent now that I have devised a novel and useful construction in a very simple combination. Obviously changes in detail may be made without departing from the spirit of the invention and I do not care to limit myself to any particular form or arrangement of these elements.

What I claim is:

1. In a motor vehicle construction, the combination of a chassis frame, an axle, an inverted leaf spring attached near its center to the frame, an eye on the end of the said leaf spring, a bracket on the axle, a yoke swivelled in the bracket, a pin in the yoke engaging the eye of the spring, a boss on the bracket bearing against the said spring in spaced relation to the pin, a safety strap attached to the said boss and passing over the said spring with clearance between the sides of the spring and the strap to permit lateral motion of the spring occasioned by rotation of the yoke on its axis.

2. In a motor vehicle construction, the combination of elements set forth in claim 1, the geometric relation thereof being such that the axle is moved away from the point of spring-frame attachment when spring load is increased, and the axle is moved toward the point of spring-frame attachment when spring load is decreased.

3. In combination, a chassis frame, an axle, an inverted leaf spring attached near its center to the frame, an eye on the end of the said leaf spring, a bracket on the axle, a pin in the bracket engaging the eye of the spring, a boss on the bracket bearing against the said spring in spaced relation to the pin, the relative arrangement of the axle, pin and boss being such that when spring deflection occurs, the axle and the point of spring-frame attachment will move apart.

4. In a motor vehicle construction, the combination of a chassis frame, an axle with wheels thereon, brakes on the wheels, an inverted leaf spring attached near its center to the frame, an eye on the end of the spring, a bracket on the axle, a yoke swivelled in the bracket, a pin in the yoke engaging the eye of the spring, a boss on the bracket bearing against the spring in spaced relation to the pin, a strap attached to the bracket and passing over the body of the spring in spaced relation to the eye of the spring, said boss and strap free to move laterally of the said spring when the swivel rotates and means transferring brake reaction to the spring independent of axle and swivel rotation.

5. In a motor vehicle construction, the combination with a chassis frame of two adjacent rear axles, means connecting the foremost rear axle to the frame including leaf springs connected to said frame near their central portions and means connecting the rearmost axle to the frame comprising said springs alone, the connection between said springs and said rearmost axle embodying eyes on the springs engaging yokes swivelled on vertical axes supported on said axle and bosses on said axle bearing against said springs in spaced relation to said eyes.

6. In a motor vehicle construction, the combination with a chassis frame of two adjacent rear axles, means connecting the foremost rear axle to the frame including leaf springs connected to said frame near their central portions and means connecting the rearmost axle to the frame comprising said springs alone, the connection between said springs and said rearmost axle embodying eyes on the springs engaging yokes swivelled on vertical axes supported on said axle and bosses on said axle bearing against said springs in spaced relation to said eyes, the geometric relation between said eyes, bosses and axle being such that said rearmost axle is moved out of parallel relation with said foremost axle by unequal deflection of said springs.

7. In a motor vehicle construction, the combination with a chassis frame of two adjacent rear axles, means connecting the foremost rear axle to the frame including leaf springs connected to said frame near their central portions and means connecting the rearmost axle to the frame comprising said springs alone, each of said springs engaging said rearmost axle at two points in spaced relation thereabove, one of said points being pivotal on a vertical axis.

8. In a motor vehicle construction, the combination with a chassis frame of two adjacent rear axles, means connecting the foremost rear axle to the frame including leaf springs connected to said frame near their central portions and means connecting the rearmost axle to the frame comprising said springs alone, each of said springs engaging said rearmost axle at two points in spaced relation thereabove, one of said points being pivotal on a vertical axis, the geometric relation between said points and said rearmost axle being such that said rearmost axle is moved out of parallel relation with said foremost axle by unequal deflection of said springs.

9. In a motor vehicle construction, the combination of a chassis frame, an axle and leaf springs connected to said frame forward of said axle, each of said springs engaging said axle at two points in spaced relation thereabove, one of said points being pivotal on a vertical axis permitting changeable angular relation between said springs and said axle.

10. In a motor vehicle construction, the combination of a chassis frame, an axle and a plurality of inverted leaf springs attached near their centers to the frame, eyes on the ends of said springs, brackets on the axle, yokes swivelled in the brackets, pins in the brackets engaging the spring eyes, bosses on the brackets bearing against the springs in spaced relation to the pins, safety straps attached to the said bosses and passing over the said springs with clearance between the sides of the springs and the straps to permit lateral motion of the springs occasioned by rotation of the yokes on their axes.

JOHN G. UTZ.